United States Patent
Kim

(10) Patent No.: US 12,229,753 B2
(45) Date of Patent: *Feb. 18, 2025

(54) METHOD AND SYSTEM FOR MOBILE CRYPTOCURRENCY WALLET CONNECTIVITY

(71) Applicant: Coinbase, Inc., Oakland, CA (US)

(72) Inventor: Peter Jihoon Kim, San Francisco, CA (US)

(73) Assignee: Coinbase, Inc., Oakland, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 18/182,289

(22) Filed: Mar. 10, 2023

(65) Prior Publication Data
US 2023/0281607 A1  Sep. 7, 2023

Related U.S. Application Data

(63) Continuation of application No. 16/993,818, filed on Aug. 14, 2020, now Pat. No. 11,676,133.
(Continued)

(51) Int. Cl.
*G06Q 20/36* (2012.01)
*G06F 16/23* (2019.01)
(Continued)

(52) U.S. Cl.
CPC ..... *G06Q 20/3674* (2013.01); *G06F 16/2379* (2019.01); *G06K 19/06037* (2013.01);
(Continued)

(58) Field of Classification Search
CPC ........... G06Q 20/3674; G06Q 20/0655; G06Q 20/326; G06Q 20/3276; G06Q 20/3821; G06Q 20/3825; G06Q 20/3829; G06Q 20/383; G06Q 2220/00; G06Q 20/02; G06Q 20/065; G06Q 20/223; G06Q 20/36; G06Q 20/3678; G06F 16/2379; G06K 19/06037; H04L 9/0637; H04L 63/0428; H04L 9/50; H04L 2209/56
See application file for complete search history.

(56) References Cited

U.S. PATENT DOCUMENTS 9,338,156 B2 * 5/2016 Oberheide .......... H04W 12/068
2008/0022374 A1 * 1/2008 Brown ................ H04L 63/0823
726/5
(Continued)

OTHER PUBLICATIONS

Burton "WalletConnect: A simple way for web-based apps to talk to mobile wallets", Medium, Mar. 25, 2018, https://medium.com/balance-io/walletbridge-a-simple-way-for-web-based-dapps-to-talk-to-mobile-wallets-5c4015f1838c (Year: 2018).*
(Continued)

*Primary Examiner* — John W Hayes
*Assistant Examiner* — Yingying Zhou
(74) *Attorney, Agent, or Firm* — Foley & Lardner LLP

(57) ABSTRACT

The method 10 for mobile cryptocurrency wallet connectivity can include facilitating a blockchain transaction S100 and establishing an initial connection between a mobile client and a web client S200. The system 20 for mobile cryptocurrency wallet connectivity can include a browser 110, one or more websites 120, a web client 130, a mobile application 140, and a backend server 150.

20 Claims, 11 Drawing Sheets

Related U.S. Application Data

(60) Provisional application No. 62/890,503, filed on Aug. 22, 2019.

(51) Int. Cl.
| | |
|---|---|
| *G06K 19/06* | (2006.01) |
| *G06Q 20/06* | (2012.01) |
| *G06Q 20/32* | (2012.01) |
| *G06Q 20/38* | (2012.01) |
| *H04L 9/00* | (2022.01) |
| *H04L 9/06* | (2006.01) |
| *H04L 9/40* | (2022.01) |

(52) U.S. Cl.
CPC ....... *G06Q 20/0655* (2013.01); *G06Q 20/326* (2020.05); *G06Q 20/3276* (2013.01); *G06Q 20/3821* (2013.01); *G06Q 20/3825* (2013.01); *G06Q 20/3829* (2013.01); *G06Q 20/383* (2013.01); *H04L 9/0637* (2013.01); *H04L 63/0428* (2013.01); *G06Q 2220/00* (2013.01); *H04L 9/50* (2022.05); *H04L 2209/56* (2013.01)

(56) References Cited

U.S. PATENT DOCUMENTS

| | | | | |
|---|---|---|---|---|
| 2020/0020032 | A1* | 1/2020 | Bleznak | G06Q 20/223 |
| 2020/0042991 | A1* | 2/2020 | Brown, Jr. | G06Q 20/388 |
| 2020/0394183 | A1* | 12/2020 | Jois | G06F 16/9024 |
| 2021/0119785 | A1* | 4/2021 | Ben-Reuven | H04L 9/3239 |
| 2021/0264410 | A1* | 8/2021 | Paek | H04L 9/0825 |

OTHER PUBLICATIONS

Buterin "Ethereum Whitepaper", Dec. 2014, https://ethereum.org/669c9e2e2027310b6b3cdce6e1c52962/Ethereum_Whitepaper_-_Buterin_2014.pdf (Year: 2014).*

* cited by examiner

2

METHOD AND SYSTEM FOR MOBILE CRYPTOCURRENCY WALLET CONNECTIVITY

CROSS-REFERENCE TO RELATED APPLICATIONS

This application is a continuation of U.S. patent application Ser. No. 16/993,818, filed Aug. 14, 2020, which claims priority to U.S. Provisional Application No. 62/890,503, filed Aug. 22, 2019. The content of the foregoing applications is incorporated herein in its entirety by reference.

TECHNICAL FIELD

This invention relates generally to the cryptocurrency field, and more specifically to a new and useful method and system for facilitating wallet connectivity and transaction signing in the cryptocurrency field.

BACKGROUND

Decentralized applications (Ðapp, DApp, Dapp, dApp, or Ethapp) are computer applications that are built on distributed computing systems, such as blockchain networks. As such, DApps oftentimes need transactions, generated by a frontend interface and signed by a user's cryptographic wallet, to execute DApp calls and functionalities on said blockchain networks. Conventionally, the DApps' frontend is hosted on a DApp website, accessible via a browser. The user's cryptographic wallet is typically a wallet application (e.g., native application) executing on a separate device; the wallet application must be connected to the DApp in order to facilitate transaction signing. Conventionally, each individual DApp connects to the wallet application independently. However, this leads to poor user experiences, particularly when a user wants to transact with multiple DApps, as the user then has to independently connect their wallet application ("wallet") to each DApp. This can result in errors and security risks, such as DApps lacking support for a particular wallet version or type, user errors in connecting the wallet to each DApp, and DApps losing session identifiers or secrets.

Thus, there is a need for an improved system and method for connecting wallets to DApps.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 3:
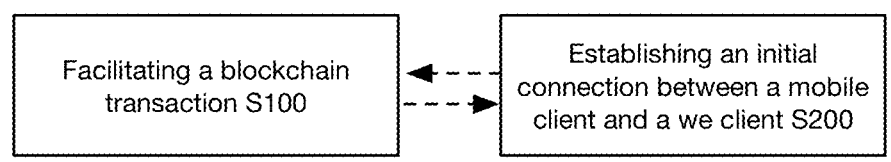
FIG. 3 is a schematic representation of an example of the method.

As shown in FIG. 3, the method 10 for mobile cryptocurrency wallet connectivity includes facilitating a blockchain transaction S100 and establishing an initial connection between a mobile client and a web client S200. However, the method can additionally or alternatively include and/or any other suitable elements.

Figure 2:
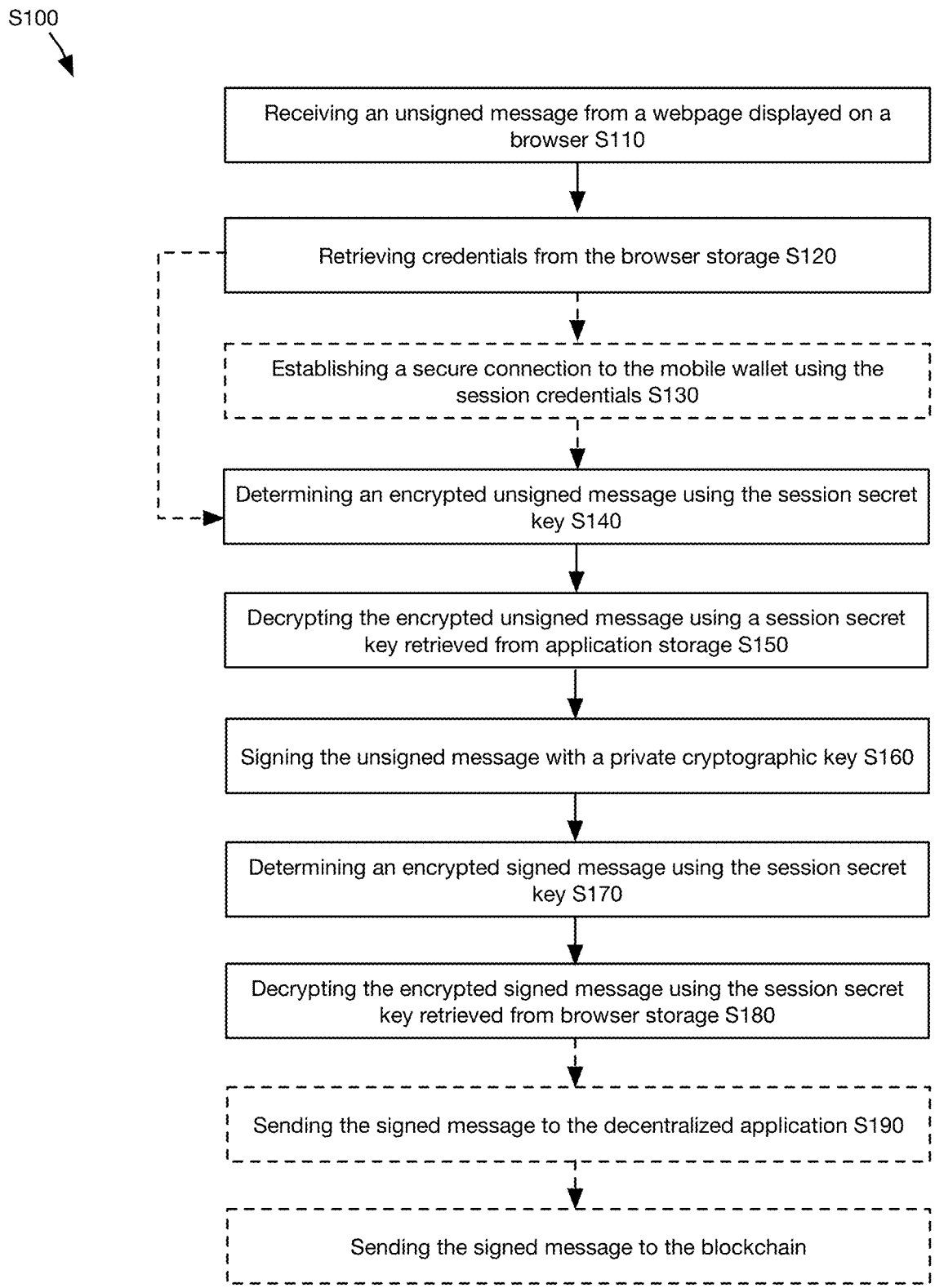
FIG. 2 is a schematic representation of the method for remote cryptographic signing.

As shown in FIG. 2, facilitating a blockchain transaction S100 preferably includes: receiving an unsigned message from a webpage displayed on a browser S110, retrieving credentials from the browser storage S120; optionally establishing a connection to the mobile wallet using the session credentials S130; determining an encrypted unsigned message using the session secret key S140; decrypting the encrypted unsigned message using a session secret key retrieved from application storage S150; signing the unsigned message with a private cryptographic key S160; determining an encrypted signed message using the session secret key S170; optionally decrypting the encrypted signed message using the session secret key retrieved from browser storage S180; sending the signed message to the decentralized application S190; and optionally repeating S110-S190 for a one or more websites different from the first website. However, S100 can additionally or alternatively include any other elements.

Figure 1:
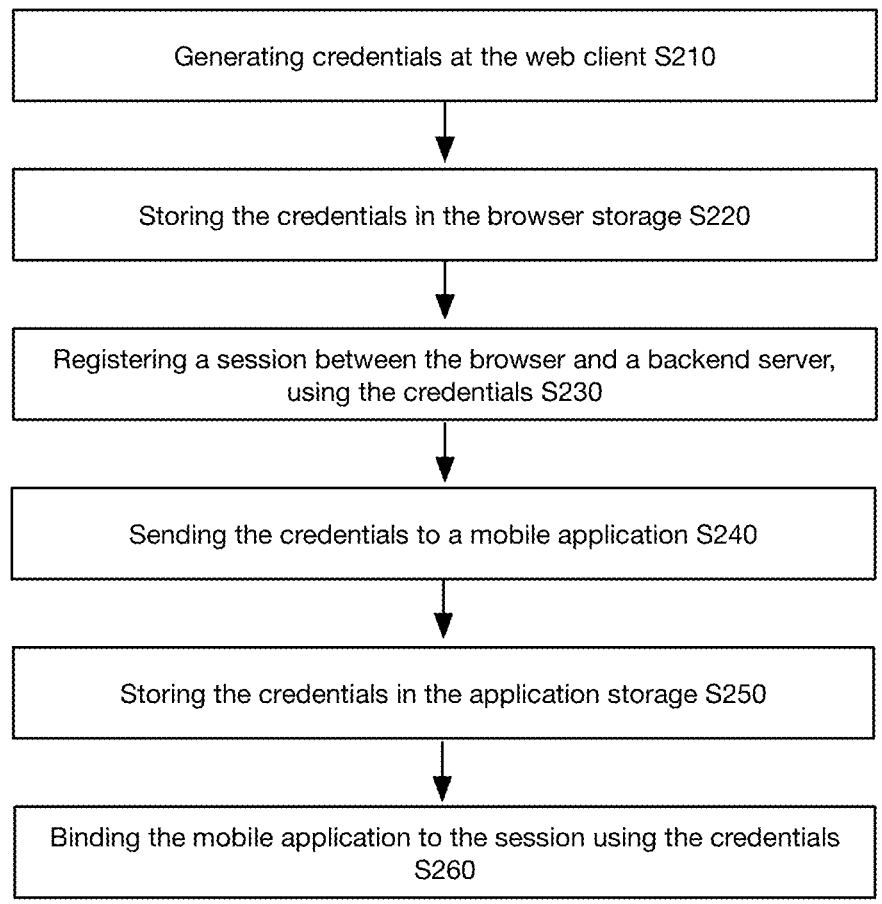
FIG. 1 is a schematic representation of the method for connecting to a mobile wallet.

As shown in FIG. 1, establishing an initial connection between a mobile client and a web client S200 includes: generating credentials at the web client S210; storing the credentials in the browser storage S220; registering a session between the browser and a backend server using the credentials S230; sending the credentials to a mobile application S240; storing the credentials in the application storage S250; and binding the mobile application to the session using the credentials S260. However, S200 can additionally or alternatively include any other elements.

Figure 4:
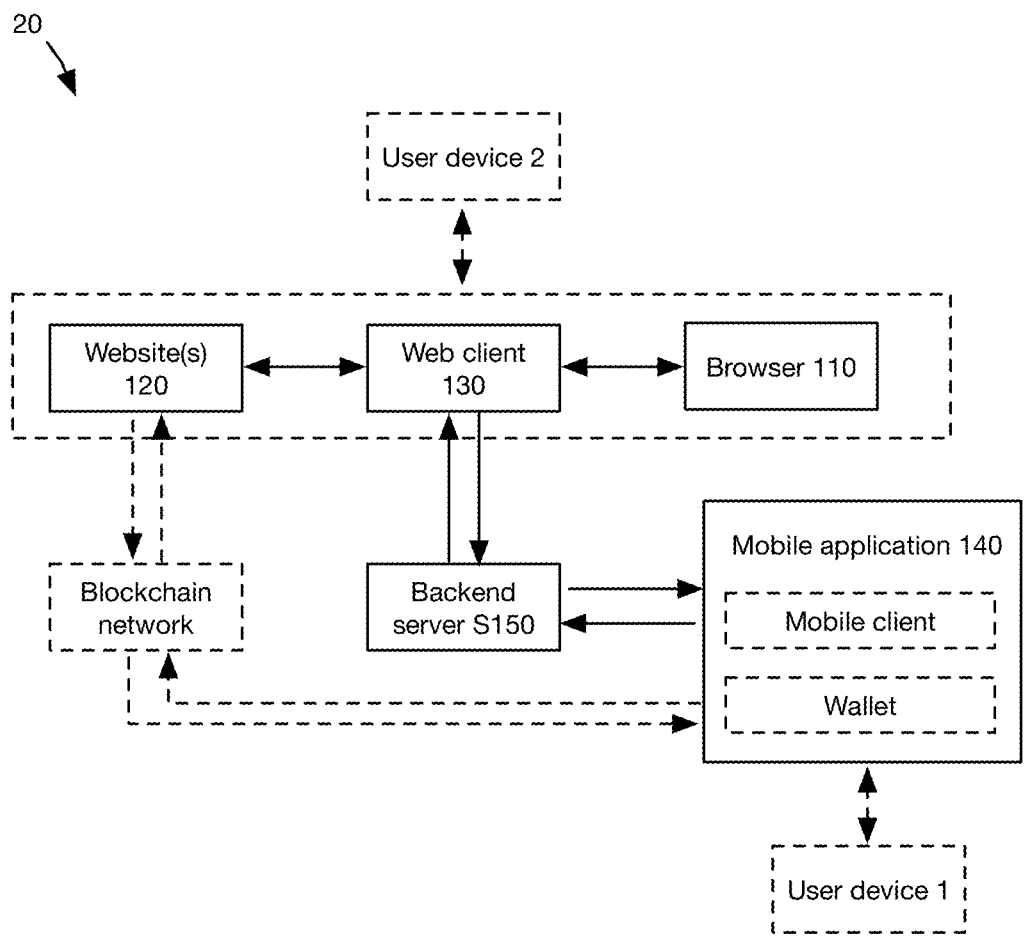
FIG. 4 is a schematic representation of the system.

As shown in FIG. 4, the system 20 for mobile cryptocurrency wallet connectivity can include a browser 110, one or more websites 120, a web client 130, a mobile application 140, and a backend server 150. However, the system can additionally or alternatively include any other suitable elements.

2. Examples

In a first example, the method and system establish an end-to-end encrypted private communication channel between the wallet and a user's web browser. The end-to-end encrypted private communication channel is established by generating credentials, including a session identifier and a shared secret key, at the client, transferring the credentials to the mobile wallet application (e.g., via a QR code scannable by the mobile wallet application), registering the session at a backend server using the credentials, and binding the client and/or wallet application to the session at the backend server. The credentials are stored locally at the mobile wallet and in local storage at the browser, and are not shared with the backend or the webpage. The shared secret key can then be used to encrypt messages passed through the communication channel (e.g., to encrypt signed payment information, signed blockchain transactions, etc.). Specific examples of the method and system are depicted in FIGS. 6-11.

Because the credentials are stored in browser storage (e.g., local storage), and not by the webpage (DApp), the same credentials (e.g., secret key and communication channel) can be reused by different webpages to transact with the same wallet, as long as the other webpages each embed an instance of the client. In this example, another webpage's instance of the client can retrieve the session identifier and the session secret key from the browser's storage, encrypt the unsigned transaction using the secret key, and send the message to the wallet using the communication channel.

3. Benefits

The method and system resolve particular Internet-centric problems. In particular, the method and system address the problem of repeatedly linking a mobile blockchain wallet application to every new distributed application that a user uses. The method and system can resolve this issue in several ways.

First, the method and system can enable browser binding (e.g., wallet bound to browser), which enables transactions on any webpage to be bound to the same communication channel, not just the webpage that was used to establish the communication channel.

Second, the method and system can enable multiple webpages to securely interact with the same mobile wallet application via the communication channel by storing the session credentials in browser storage (accessible by different instances of the client embedded in each website). In particular, the system and method can enable end to end encryption, which enables user information to stay private (e.g., not accessible to the website). Additionally or alternatively, the system and method can use asymmetric encryption and/or any other encryption scheme.

Third, the method and system can enable websites developed using a Web 2.0 framework to interact with cryptocurrency wallets and the blockchain.

However, the method and system can confer any other suitable benefits.

4. System

The method 10 is preferably performed using the system 20, including: a browser, one or more websites, a web client, a mobile application, a backend, one or more user devices, and/or any other components. The system can be used with session credentials and/or any other elements.

The browser preferably functions to deliver a requested website to the user. The browser is preferably a desktop browser, but can additionally or alternatively be a mobile browser, and/or any other browser. The browser and the wallet can be accessed on the same or different user devices. The browser can display websites created in HTML, XML, XHTML, and/or any other markup language. The browser preferably executes on a user device (e.g., smartphone, tablet, laptop, desktop, etc.), different from or the same as the user device executing the mobile application. The browser can include or be able to access browser storage (e.g., a web storage object, such as localStorage or sessionStorage, local storage, cache, cookie, etc.). The local storage preferably stores data (e.g., credentials, key/value pairs, website data, etc.) such that the stored data persists after a page refresh, when the browser is closed and reopened, a full browser restart, and/or other browser event. The stored data can have no storage expiration data and/or expire after a period of time (e.g., 1 day, 1 week, etc.). The stored data can be encrypted (e.g., with a client key, retrieved from the backend or other storage, etc.) or unencrypted. The local storage can additionally or alternatively include any other elements. However, the browser can include any other components.

The one or more websites (e.g., delivered to the user using the browser) preferably functions as a front-end interface for a decentralized application (DApp), centralized application, or any other application. The website can generate unsigned blockchain transactions or messages that allow a user to interact with the application. The website can additionally or alternatively provide any other functionality.

The website is preferably associated with a domain name (and/or an IP address), and a server hosting the website (and/or a database). The website preferably includes one or more webpages, wherein one or more of the webpages includes the web client (e.g., the web client is embedded in the webpage). The website is preferably executed and/or loaded by a browser.

The website can be a web 3.0 application, a web 2.0 application (e.g., read-write web, using AJAX, Javascript, etc.), and/or use any other suitable framework.

The DApp preferably functions to execute transactions. The transactions can be executed on distributed ledger technologies (DLT), such as a blockchain (e.g., Ethereum, TRON, EOS, Bitcoin, Stee, etc.). The DApp can be a smart contract on the blockchain. Examples of the DApps include: Cryptokitties™, Compound™, exchanges (e.g., Curve™), and/or any other DApp.

In an example, the website can: receive a user request (e.g., purchase requests, such as token purchase requests, data logging requests, and/or DApp control requests, voting inputs, etc.); determine a user's blockchain address (e.g., received from the user, retrieved from server storage); and generate a transaction based on the user's blockchain address, the user request, and a DApp identifier on the respective blockchain (e.g., the DApp's smart contract's address).

The web client can function to: retrieve session credentials when session credentials are available; generate session credentials (e.g., when session credentials are unavailable, when a different user or profile is using the browser, when the user wants to connect a different wallet, etc.); inject web client code into the webpage; control communications with the remote wallet (e.g., encrypt or decrypt messages, determine which communication channel to send the messages through, etc.); establish a communication channel with the backend; communicate with the website to send and/or receive messages from the website; and/or provide any other functionality.

The web client is preferably associated with a web client domain, database, and/or server. The web client can be created using the Javascript SDK, and/or any other SDK.

In a first variant, the web client is embedded in the webpage (e.g., one or more lines of code of the webpage.), wherein the web client is executed by the webpage. In examples, the web client can be an iframe, an embedded object (e.g., wherein object data is retrieved from the web client domain), embedded link to a predetermined universal resource identifier (URI) (e.g., the web client domain), and/or any other embedded code.

In a second variant, the web client can be a browser extension that receives messages from the website and injects a blockchain web API into the website (e.g., into the javascript or HTML context).

In a third variant, the web client can include web3 javascript library, injected by an external provider (e.g., a browser extension, the browser, URL extension, etc.) into the website's code.

However, the web client can additionally or alternatively include any other components.

The mobile application can function to: control communication with the web client (e.g., encrypt or decrypt messages, determine which communication channel to send the messages through, etc.); store session credentials; establish a communication channel with the backend; sign transactions (or facilitate transaction signing), and/or provide any other suitable functionality.

The mobile application can execute on a user device (e.g., smartphone, tablet, laptop, desktop, etc.), different from or the same as the user device executing the browser.

In a first variant, the mobile application can include a wallet. The wallet is preferably a hierarchical Deterministic wallet (HD wallet, but can alternatively be a deterministic wallet, or any other suitable wallet. The wallet preferably accesses a private cryptographic key (e.g., private signing key, private key, etc.) or seed thereof for signing a transaction, but can additionally or alternatively access any other payment information. The wallet can access the payment information from a local device storage, from a hardware security module (HSM), from third party storage (e.g., such as described in U.S. application Ser. No. 16/452,195 filed 25 Jun. 2019, which is incorporated herein in its entirety by this reference), and/or any other suitable storage. Alternatively, the wallet can derive the payment information from a seed phrase received from a user, and/or otherwise determine the payment information.

The private cryptographic key is preferably custodied (e.g., controlled) by the user, such that the web client does not custody the user's cryptographic assets. The private cryptographic key is preferably accessed in order to sign transactions (e.g., the wallet signs the transaction in response to receipt of user verification of the transaction). However, the private cryptographic key can be custodied by a third party or otherwise custodied.

The wallet can be stored on the user device and/or on any other device. The wallet can be a software application, a hardware device, and/or any other suitable wallet. However, the wallet can additionally or alternatively include any other suitable elements.

In a second variant, the mobile application can include a mobile client, which functions to interface the web client and/or backend with a third-party mobile wallet. The mobile client preferably executes on the user device, but can additionally or alternatively execute on any other device.

In a first example, the mobile client can receive encrypted messages via the communication channel, decrypt the messages using the session credentials, and locally send the decrypted message to the wallet.

In a second example, the mobile client can receive signed messages from the wallet, encrypt the signed messages using the session credentials, and send the encrypted signed messages to the web client and/or the backend via the communication channel.

The mobile client can retrieve the session credentials from local mobile storage (e.g., storage at the user device) or from any other storage. However, the mobile client can additionally or alternatively include any other suitable elements.

However, the mobile application can include a combination of the above, or additionally or alternatively include any other suitable elements.

The backend (e.g., remote computing system, including one or more servers) can function to register a session and forward messages between the browser and the mobile application using the communication channel. The backend preferably concurrently manages multiple sessions, each associated with a different browser-mobile application pair, but can alternatively concurrently manage a single session. The backend can optionally enforce channel rules (e.g., one mobile client associated with each session identifier). The backend can optionally store endpoint information, such as a browser identifier (e.g., an IP address, user's blockchain address, etc.), a mobile application identifier (e.g., mobile application number, user device identifier, etc.). The backend can be identified by an IP address, URI, domain name, and/or otherwise identified. However, the backend can additionally or alternatively include any other suitable components.

The user devices can function to execute the browser, the mobile application, and/or any other component. The user device preferably connects to the backend to send messages using the communication channel. The system preferably includes two or more user devices, but can additionally or alternatively include one user device. The user device can include one or more: user inputs (e.g., e.g., touchscreen, microphone, camera, etc.), displays (e.g., screen, speakers, lights, etc.), onboard storage (e.g., volatile or nonvolatile), processing systems (e.g., microprocessors, CPU, GPU, ASIC. TPU, etc.), sensors, communication systems, and/or other components.

The communication system can include long range communication (e.g., Wi-Fi radio, cellular radio, etc.), which can enable Internet connection; short-range communication (Bluetooth, NFC, etc.), which can enable range-limited communication; and/or any other suitable communication system. The short-range communication can enable communication between the web client and the mobile application (e.g., to send the credentials from the web client to the mobile application, to send messages between the mobile application and the web client, etc.). However, the user devices can additionally or alternatively include any other suitable components.

The system can be used with one or more session credentials, which can function to: identify a communication channel between the backend, the web client, and the mobile application; facilitate transaction signing for multiple DApps (e.g., using the same session credentials); and connect multiple mobile applications to the same browser instance. However, the session credentials can additionally or alternatively provide any other functionality.

The session credentials can include a secret key, a session identifier, and/or any other elements. The secret key is preferably a symmetric key, but can additionally or alternatively be an asymmetric key. When the secret key is an asymmetric key (e.g., public key and private key), the web client generates one secret key and mobile client generates another secret key, then the web client and mobile application exchange their respective public keys. The session identifier is preferably an identifier for a persistent session, but can additionally or alternatively be an identifier for a nonpersistent session. The session identifier can be determined randomly, sequentially, can be a hash of the browser instance, can be a hash of the client instance, can be an API token, and/or otherwise determined.

The session credentials can be established (e.g., generated, retrieved, stored, etc.) by a web client instance executing on a particular DApp webpage, by a website connected to the backend (e.g., wherein the browser is connected to the mobile application before DApp websites are visited), by a web client instance executing on a browser (e.g., a browser extension, as code embedded in another application, etc.), by the mobile application, by the backend, and/or established by another system. All or a portion of the session credentials are preferably encrypted while stored and decrypted for use, wherein the cleartext version can be deleted after use, but can additionally or alternatively be stored in cleartext. When the session credentials are encrypted, the decryption and/or encryption key can be: retrieved from the backend, derived based on a seed provided by the backend, or otherwise determined by a decryption system.

However, the system 20 can additionally or alternatively include any other suitable elements.

5. Method

The method for mobile cryptocurrency wallet connectivity preferably includes facilitating a blockchain transaction S100 and establishing an initial connection between a mobile client and a web client S200. However, the method can additionally or alternatively include and/or any other suitable elements.

5.1 Facilitating a Blockchain Transaction S100.

Facilitating a blockchain transaction S100 preferably functions to enable a transaction to be signed by a system (e.g., mobile wallet) that is remote from the transaction-generation system (e.g., webpage). Facilitating the transaction can be repeated for every transaction from one or more webpages (e.g., DApps). S100 can be performed in response to: a receipt of an unsigned blockchain message (e.g., transaction) from a webpage executing in the browser; a receipt of a transaction request (e.g., from the user); and/or at any other suitable time. S100 is preferably performed by the system described above (e.g., webpage, mobile application, and backend system), but can additionally or alternatively be performed by any other suitable system. The webpage can be the webpage that was used to establish the communication channel and/or a new webpage (e.g., that includes an instance of the web client).

Figure 5:
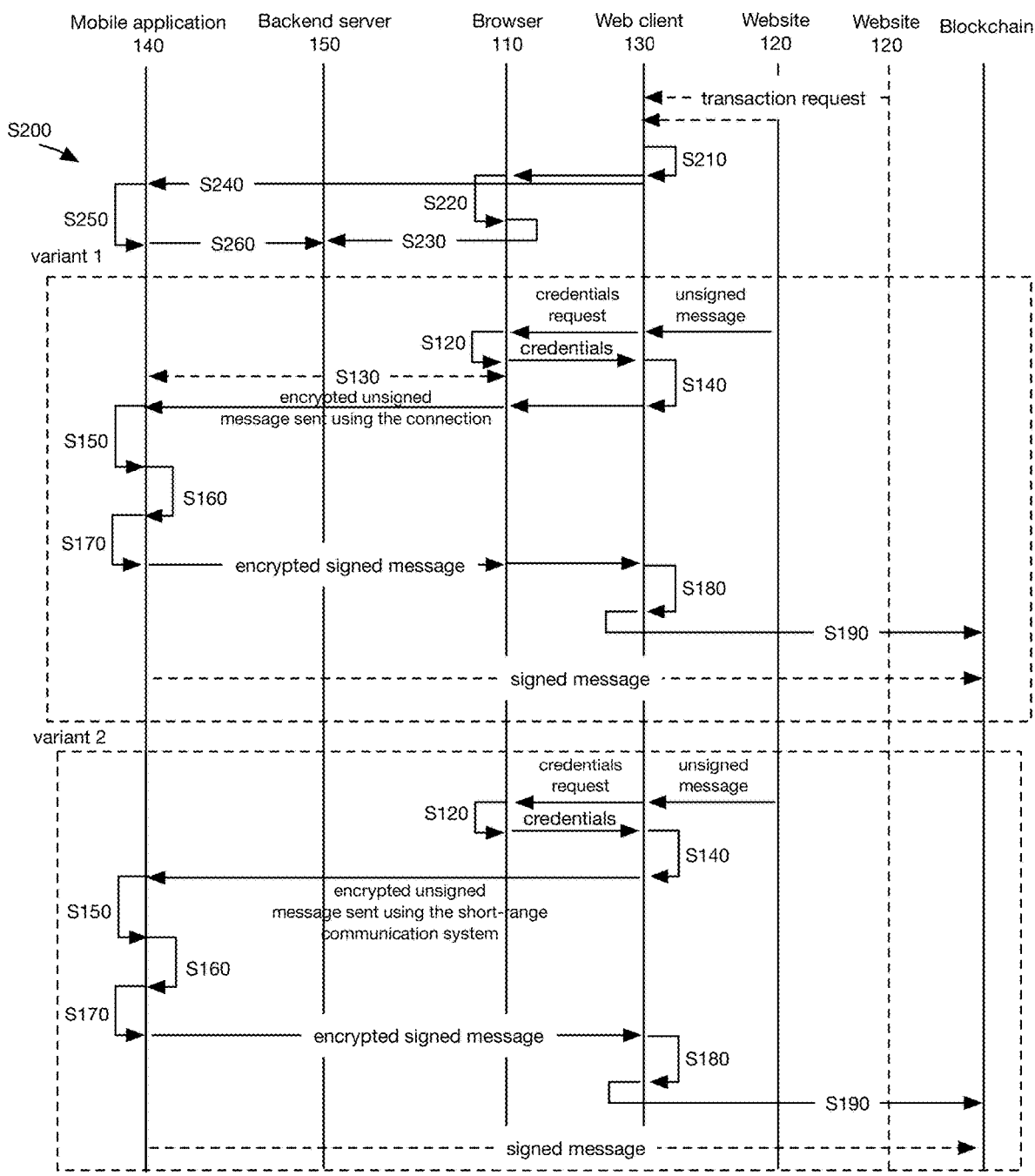
FIG. 5 depicts variants of the method and system.

Facilitating a blockchain transaction S100 preferably includes: receiving an unsigned message from a webpage displayed on a browser S110, retrieving credentials from the browser storage S120; optionally establishing a connection to the mobile wallet using the session credentials S130; encrypting the unsigned message using the session secret key S140; decrypting the encrypted unsigned message using a session secret key retrieved from application storage S150; signing the unsigned message with a private cryptographic key S160; optionally encrypting the signed message using the session secret key S170; optionally decrypting the encrypted signed message using the session secret key retrieved from browser storage S180; sending the signed message to the decentralized application S190; and optionally repeating S110-S190 for a second website, unrelated to the first website. Variants of S100 are depicted in FIG. 5. However, S100 can additionally or alternatively include any other elements.

Receiving an unsigned message from a webpage displayed on a browser S110 can function to notify the webpage to facilitate the blockchain transaction using the unsigned message. The unsigned message can be received at the web client, at the backend, or at any other suitable endpoint. The unsigned message can be received from the webpage, from the webpage's website, from the webpage's backend server, or from any other suitable system. The unsigned message can be received in response to a user action (e.g., a transaction request) on the webpage, be automatically generated and sent, or otherwise determined. The unsigned message preferably includes unsigned blockchain transaction data (e.g., associated with a public address), but can additionally or alternatively include any other data. The unsigned blockchain transaction data preferably needs to be signed by a cryptographic private key associated with the public address, wherein the private key can be accessed using the mobile application. However, the unsigned message can be otherwise determined.

In a specific example, a user selects an item for purchase on the DApp website, off chain (e.g., a cryptokitty™), where the item can be a blockchain token, have a blockchain representation, have ownership tracked on the blockchain, or be otherwise associated with the blockchain. The user can optionally enter the user's blockchain address (e.g., Ethereum address). Alternatively, the website can receive the user's blockchain address from a browser plugin, from a website database (e.g., wherein the address is stored in association with a user account on the website), or otherwise received. The user can optionally enter a purchase amount, an item parameter (e.g., color, complexity, etc.), a transaction parameter (e.g., speed, blockchain, confirmation fee or gas fee limit, etc.), and/or other transaction information. In response to receipt of a purchase request, the DApp website (or a third party website) can generate an unsigned transaction transferring the purchase amount (e.g., in cryptocurrency) from the user's address to the DApp's smart contract address (e.g., the sale contract address, determined by the website), and optionally include a function call to the smart contract with variable values (e.g., determined based on the user selection), wherein the function call can be executed by the smart contract (e.g., the DApp) on the blockchain.

Retrieving the session credentials from browser storage S120 preferably functions to determine the credentials to use to encrypt the unsigned message for sending the unsigned message to the mobile application. The session credentials are preferably retrieved by the web client from the browser storage.

In a first variant, the web client can retrieve the session credentials when the web client is loaded on the webpage.

In a second variant, the web client can retrieve the session credentials when the web client is loaded and/or executed (e.g., in response to webpage loading, in response to user selection of a webpage icon, such as "purchase").

In a third variant, the web client can retrieve the credentials after receiving a request for a signature (e.g., received from the webpage).

In a fourth variant, the web client can retrieve the credentials when a transaction request is received from a user.

However, the web client can retrieve the credentials at any other suitable time.

When the session credentials cannot be retrieved, S200 can be executed to generate session credentials for subsequent use.

The session credentials can be retrieved from browser storage, which can include local storage (e.g., document object model storage; persistent storage in the browser), session storage, cookies, storage on volatile or nonvolatile memory, and/or other storage. The browser storage can be on the computing device executing the browser and/or on any other user device. Additionally or alternatively, the session credentials can be retrieved from the web client database and/or server; and/or any other storage endpoint.

The retrieved session credentials can be all or a subset of the generated session credentials (e.g., generated in S200, such as the session secret key and the session identifier, etc.).

The session credentials can be retrieved using a predetermined key assigned to or determined by the web client, retrieved from a predetermined storage location, and/or otherwise retrieved. However, the session credentials can be otherwise determined.

Establishing a secure connection to the mobile wallet using the session credentials S130 can function to bind the browser and the mobile application to a common session, such that data can be sent between the two endpoints. The secure connection can be established by the web client and/or the browser (e.g., using S230) and the mobile application (e.g., using S260). Establishing the secure connection between the multiple endpoints can be performed synchronously and/or asynchronously.

One or both ends of the secure connection can be established when the web client or mobile application is launched or executed, after S120, after S130, in response to receipt of a user request (e.g., through a notification, through the web client, through the mobile application, etc.), and/or at any other suitable time.

Establishing the secure connection can include connecting to a predetermined URI (e.g., for the backend), and transmitting the session identifier to the backend (e.g., as part of the URI or as a separate packet), wherein the backend binds the endpoint to the session (e.g., by changing the state of the endpoint or session). The backend can optionally store an endpoint identifier in association with the session identifier, not store any identifiers, and/or store other session information. In one example, the backend does not receive nor store the session key.

The backend can optionally send notifications to any disconnected endpoints associated with the session in response to a connection request event. The connection request event can include: an encrypted message receipt at the backend; determination that a threshold number (e.g., 1) of endpoints are active and/or bound to the session; and/or any other suitable event. The disconnected endpoint can automatically connect to the backend (e.g., by retrieving the session credentials and connecting to the backend using the session identifier) in response to user interaction with the notification (e.g., opening the notification, selecting a button on the notification, etc.). However, the secure connection can be otherwise determined.

Determining an encrypted unsigned message using the session credentials S140 can function to encrypt the unsigned message to enable secure transmission. The encrypted unsigned message can be determined by the web client. The unsigned message is preferably encrypted in a signing environment. The signing environment is preferably a virtual sandbox, which can be an iframe on the web client domain (e.g., in a restricted iframe; in an iframe with sandboxed attributes; etc.). Additionally or alternatively, the unsigned message can be encrypted in a browser sandbox, in jail, in a virtual machine, on the webpage domain, or any other suitable secure or insecure encryption environment.

In a specific environment, the signing environment is an HTML 5 iframe (e.g., the web client, a different browser or window instance, etc.) with a sandbox attribute, wherein the restrictions can permit allow-scripts only, have no attribute values (e.g., applies all restrictions), allow-top-navigation only, and/or have any other suitable set of restrictions.

The unsigned message can be encrypted using the retrieved credentials, more specifically, using the session secret key (e.g., as described in S120).

Determining the encrypted unsigned message can include encrypting the unsigned message using the credentials; and sending the encrypted unsigned message to the mobile application using the secure connection with the mobile application.

The encrypted unsigned message can be sent to a single mobile application, multiple mobile applications (e.g., when the browser is shared with multiple trusted individuals, such as in a family setting), the mobile application connected to the session, or any other suitable endpoint. However, the encrypted unsigned message can be otherwise determined.

Decrypting the encrypted unsigned message using a session secret key retrieved from application storage S150 can function to determine the unsigned message (e.g., cleartext unsigned message) for signing at the mobile application. Decrypting the unsigned message can be performed in a virtual sandbox (e.g., application sandbox, such as a kernel-level application sandbox; mobile OS sandbox; etc.), in an insecure environment, in the mobile application, or in any other suitable decryption environment. The encrypted unsigned message can be decrypted using the session secret key (e.g., retrieved from application storage). The session secret key can optionally be decrypted (e.g., if stored in ciphertext), wherein the decryption key can be retrieved from the backend or otherwise determined. However, the encrypted unsigned message can be otherwise determined.

Signing the unsigned message with a private cryptographic key S160 can function to approve the transaction (e.g., by signing the transaction). The unsigned message can be cryptographically signed (e.g., according to the blockchain protocol's signing schema, etc.) by the mobile application, and more preferably by the wallet, but can additionally or alternatively be signed by any other suitable component. The private cryptographic key is preferably associated with a cryptocurrency public address (e.g., user's blockchain address) associated with the unsigned message (e.g., paired with a public key that the cryptocurrency public address was derived from, etc.), but can be otherwise related to the unsigned message. The private cryptographic key can be retrieved from: application storage, local device storage, from a hardware security module (HSM), from third party storage (e.g., such as described in U.S. application Ser. No. 16/452,195 filed 25 Jun. 2019, which is incorporated herein in its entirety by this reference), and/or any other suitable storage. The unsigned message can be signed in a virtual sandbox (same as or different from the one used in S150).

The method can optionally include verifying the user before signing the unsigned message (e.g., using passcode verification, biometric verification, such as face identification, 2 factor authentication, etc.), but can additionally or alternatively include not verifying the user identity. However, the unsigned message can be otherwise signed.

The method can optionally include determining an encrypted signed message using the credentials S170, which can function to encrypt the signed message to enable secure transmission. The encrypted signed message is preferably determined by the mobile application, and more specifically, by the mobile client, but can additionally or alternatively be determined by any other suitable component. The signed message (e.g., determined in S160) can be encrypted using the session secret key, and/or any other encryption key. Encrypting the signed message can be performed in a virtual sandbox (e.g., the same or different from that used in S150 or S160) and/or any other environment. However, the encrypted signed message can be otherwise determined.

The method can optionally include sending the encrypted signed message to the web client using the secure connection. Alternatively, the unencrypted signed message can be directly sent to the DApp (e.g., to the blockchain that the DApp is running on, to a blockchain node, etc.). Decrypting the encrypted signed message using the credentials S180 can function to determine the cleartext signed message for the webpage (e.g., DApp) use. The encrypted signed message can be decrypted by the web client and/or by any other suitable decryption system. The encrypted signed message can be decrypted in a virtual sandbox (e.g., the same or different from that used in S150 or S160) or in any other suitable decryption environment.

In a variation, the encrypted signed message can be decrypted using the session secret key retrieved in S120.

Alternatively, the encrypted signed message can be decrypted using a re-retrieved session secret key. However, the encrypted signed message can be otherwise decrypted.

Sending the cleartext signed message to the distributed application (DApp) S190 can function to provide the signed transaction to the blockchain for confirmation. The cleartext signed message (unencrypted signed message) can be sent by the web client, the mobile application (e.g., mobile client, mobile wallet, etc.), the DApp website and/or any other component. In a first variation, the cleartext signed message is sent to the webpage associated with the dApp, wherein the webpage sends the signed message to the dApp on the blockchain. In a second variation, the cleartext signed message is sent to the dApp (e.g., on the blockchain, wherein the cleartext signed message is sent to a blockchain node) by the web client. However, the cleartext signed message can optionally be sent to any other suitable endpoint. The blockchain network can include an Ethereum protocol, bitcoin protocol, and/or any other suitable protocol. However, the cleartext signed message can be otherwise sent to the DApp.

The method can optionally include repeating S100 for different webpages (e.g., associated with different DApps), using the same credentials or different credentials.

5.2 Establishing an Initial Connection Between a Mobile Client and a Web Application S200.

Establishing an initial connection between a mobile client and a web application S200 can function to initialize a communication channel between for message passing between the browser and the backend, and between the backend and the mobile application. The communication channel can be encrypted (e.g., communications sent through the channel can be encrypted using the secret key, SSL, TLS, and/or other encryption methods), unencrypted, or otherwise secured.

Establishing an initial connection between a mobile client and a web application S200 preferably includes: generating credentials S210; storing the credentials in the browser storage S220; registering a session between the browser and a backend server, using the credentials S230; sending the credentials to a mobile application S240; storing the credentials in the application storage S250; and binding the mobile application to the session using the credentials S260. However, S200 can additionally or alternatively include any other elements.

Generating credentials S210 can function to generate credentials for connecting the webpage and the mobile application (e.g., by binding intermediary components to a session). The credentials can be generated by the web client, but can additionally or alternatively be generated by the backend, or any other suitable component. The credentials can be generated in a virtual sandbox (e.g., the same or different from that used in S150 or S160) and/or any other environment. The credentials can include: a session key, a session identifier, an access token (e.g., API token), and/or any other suitable credential. The method can optionally include determining session parameters (e.g., automatically, based on user preferences, based on user risk, etc.), such as the number of mobile applications per session, the session duration, the key duration, and/or any other suitable parameter.

The credentials can be generated using a random number generator, a pseudo random number generator, a predetermined algorithm, and/or otherwise generated. In a specific example, the session key is generated using a key generation algorithm (e.g., by the web client), while the session identifier can be the next available session identifier in a sequence (e.g., provided by the backend, provided after session registration, etc.).

Storing the credentials in the browser storage S220 can function to enable a later use of the credentials (e.g., for encrypting and decrypting messages). Storing the credentials (e.g., after generation in S210) is preferably performed by the web client, but can additionally or alternatively be performed by any other component. The credentials are preferably stored at a predetermined location (e.g., browser storage), but can additionally or alternatively be stored in any other location. However, the credentials can be otherwise stored.

Registering a session between the browser and a backend server using the credentials S230 can function to initialize a session between the web client and the backend and/or any other functionality.

In a first variant, at the backend, registering a session can include: receiving the session identifier from the web client (e.g., sent by the browser or web client); and registering a session associated with the session identifier (e.g., binding the session to the session identifier). After creating the session, the backend can listen for messages from the web client and/or the browser. Optionally, registering a session can include storing a web client identifier (e.g., unique to the web client instance) or browser identifier; or alternatively, not storing any identifying information for the web client or browser. However, the session can be otherwise registered.

Figure 6:
FIGS. 6-11 depict examples of the method.
Figure 7:
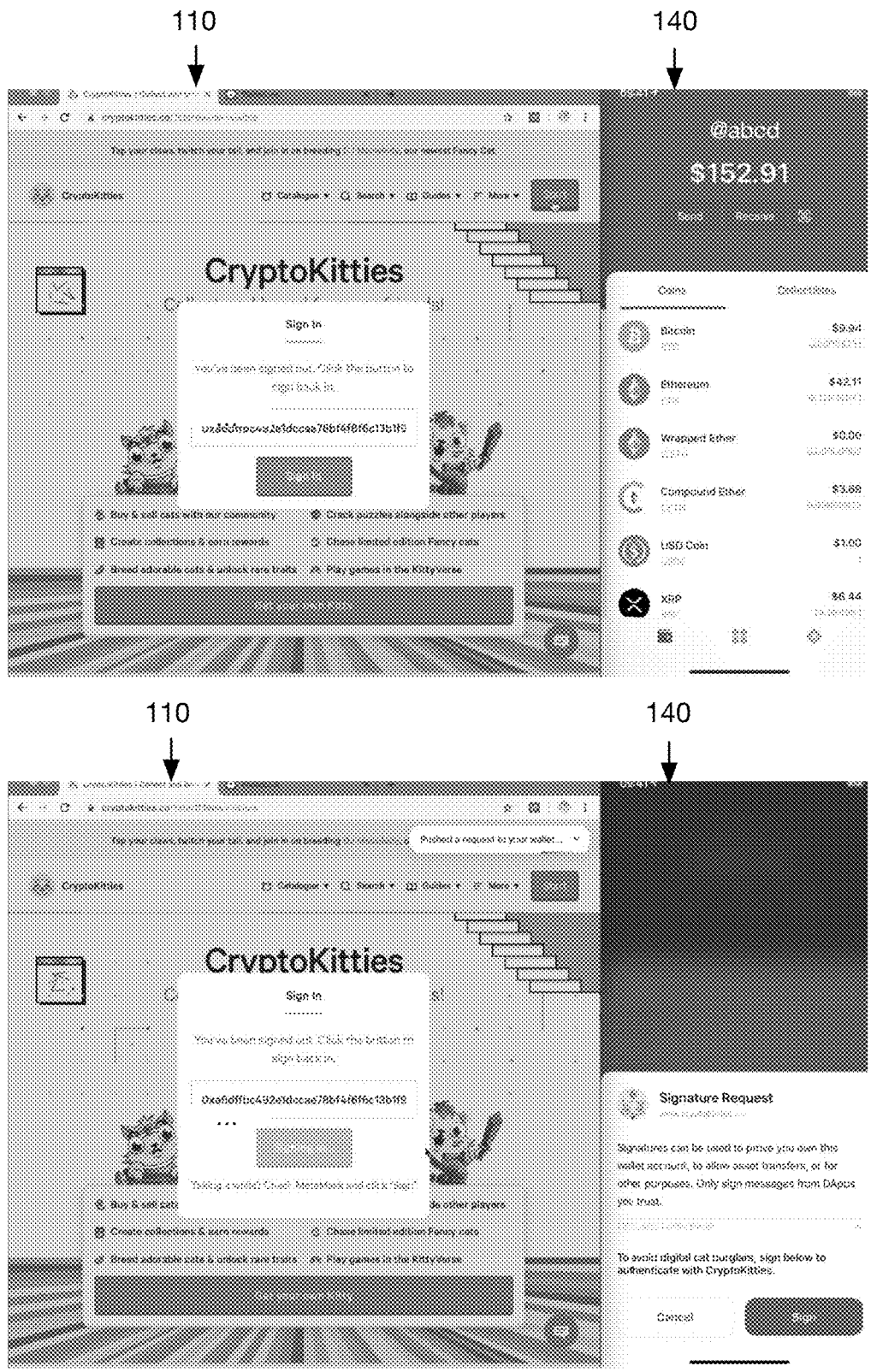
Figure 8:
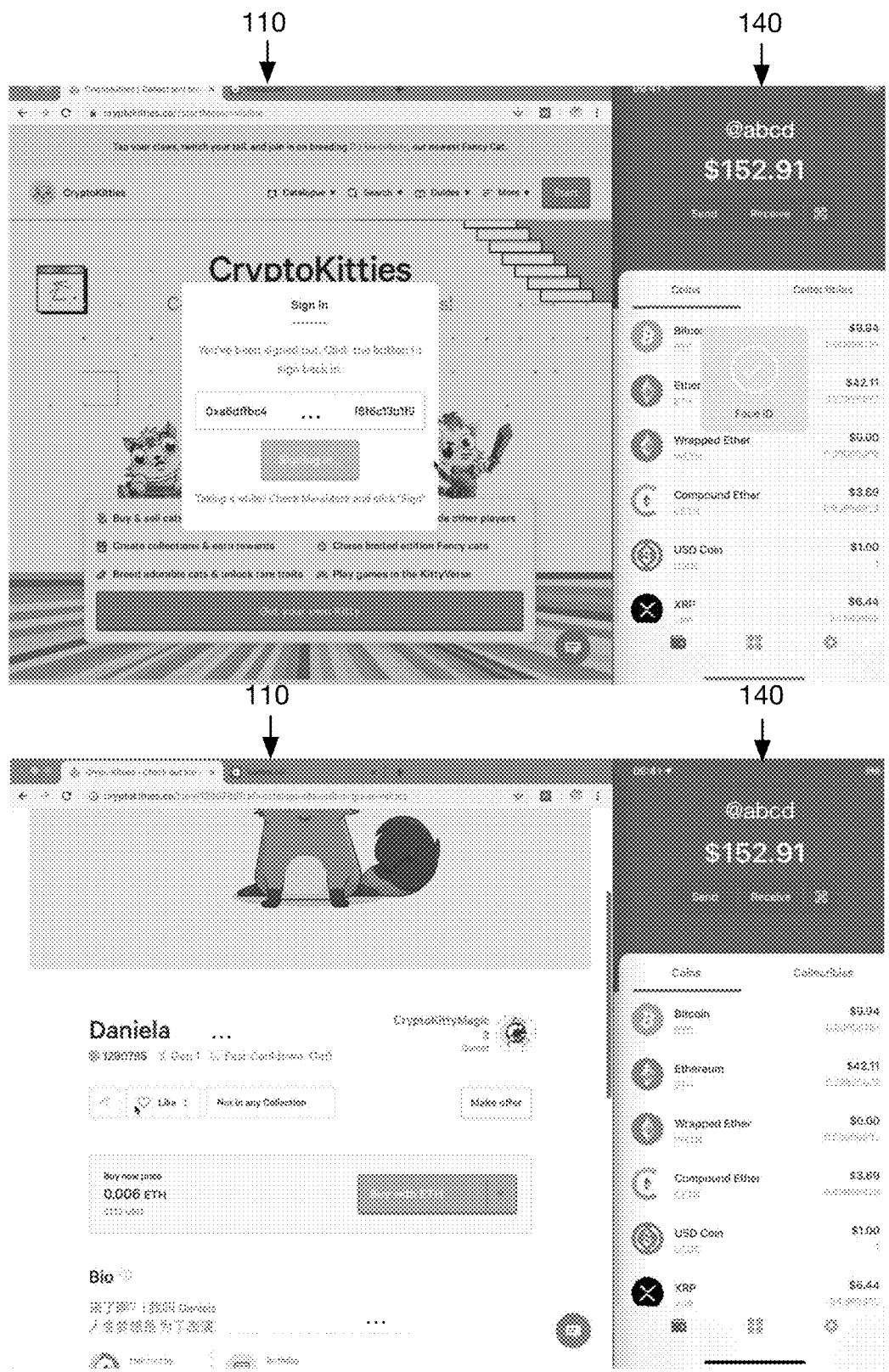
Figure 9:
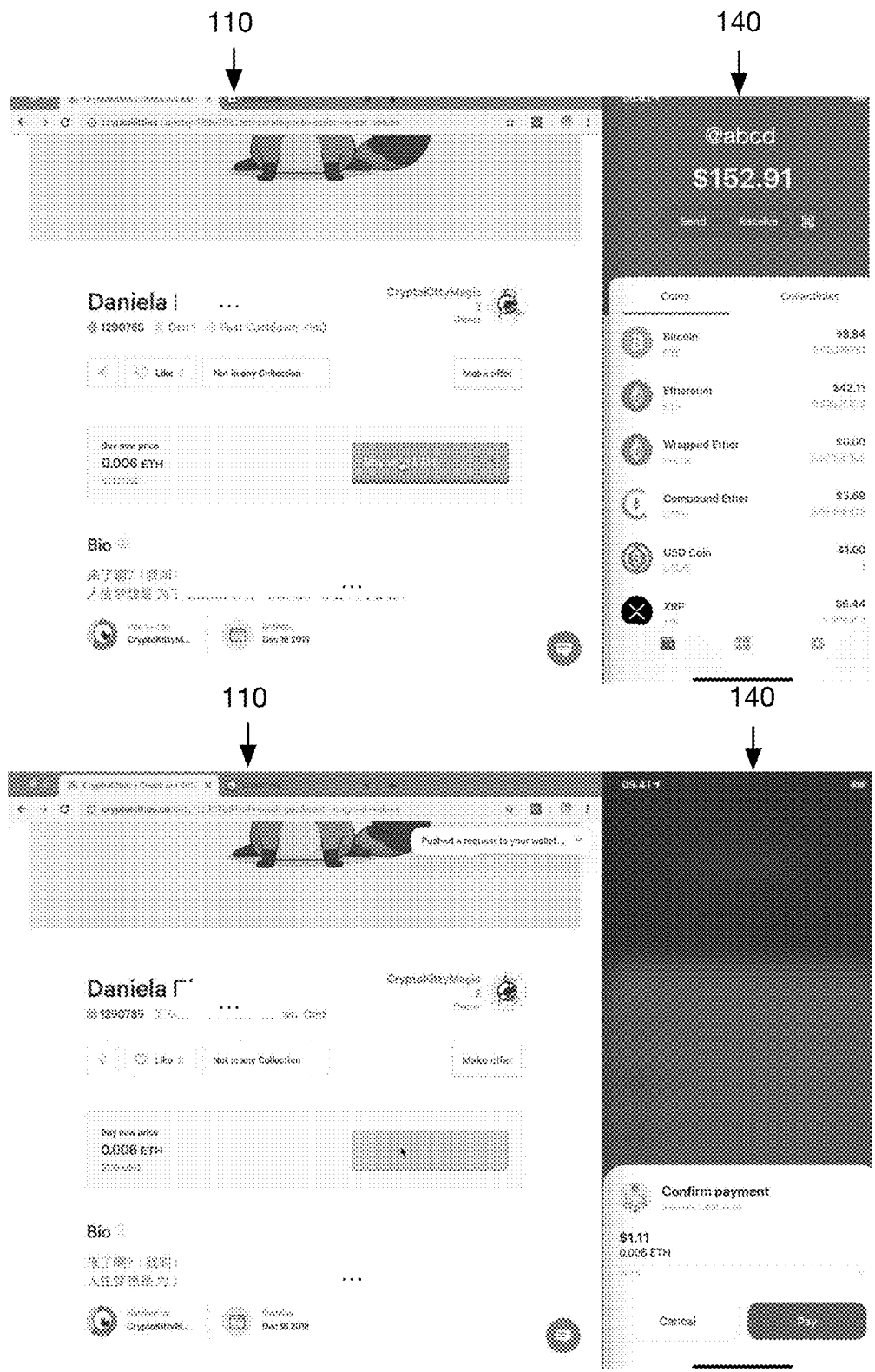
Figure 10:
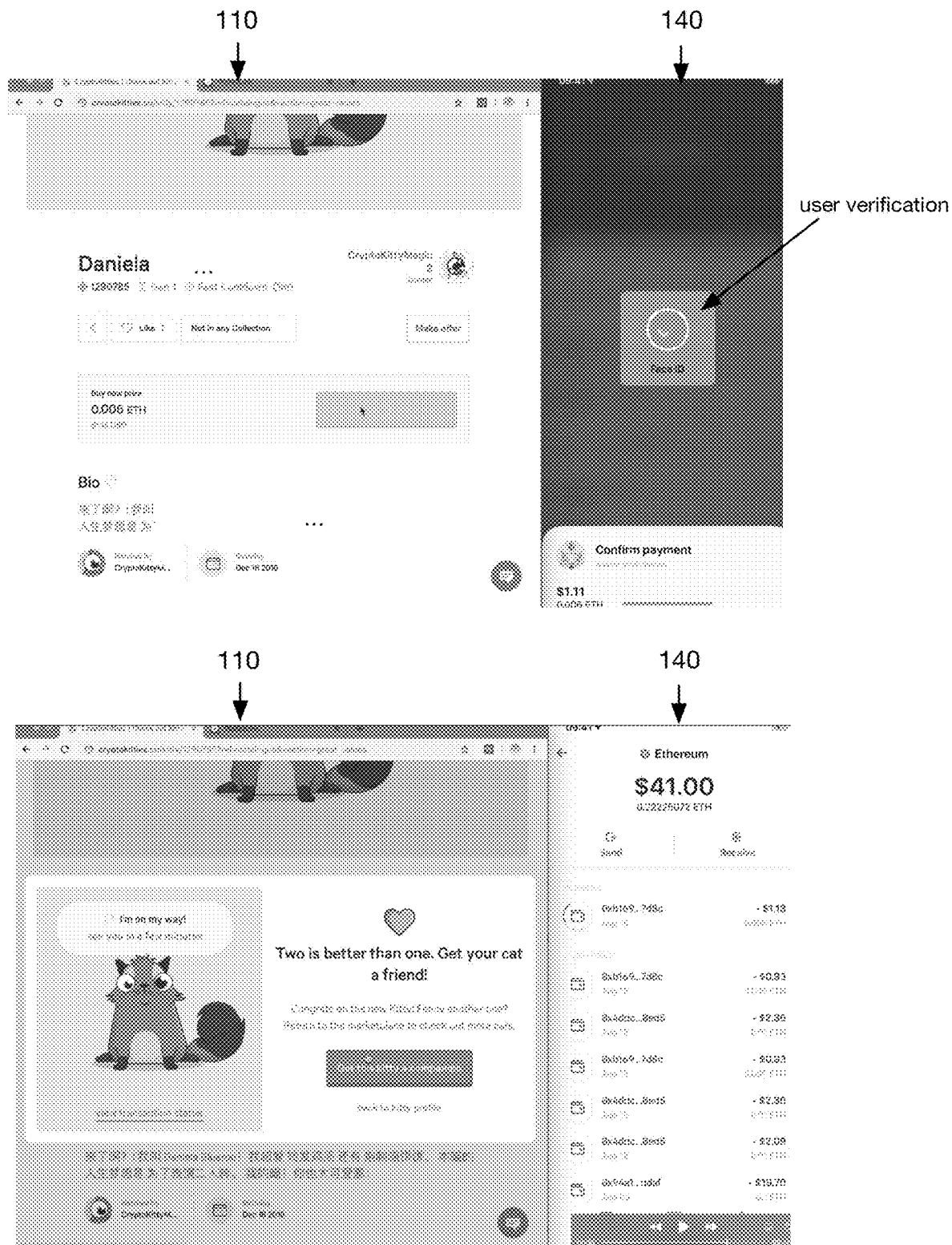
Figure 11:
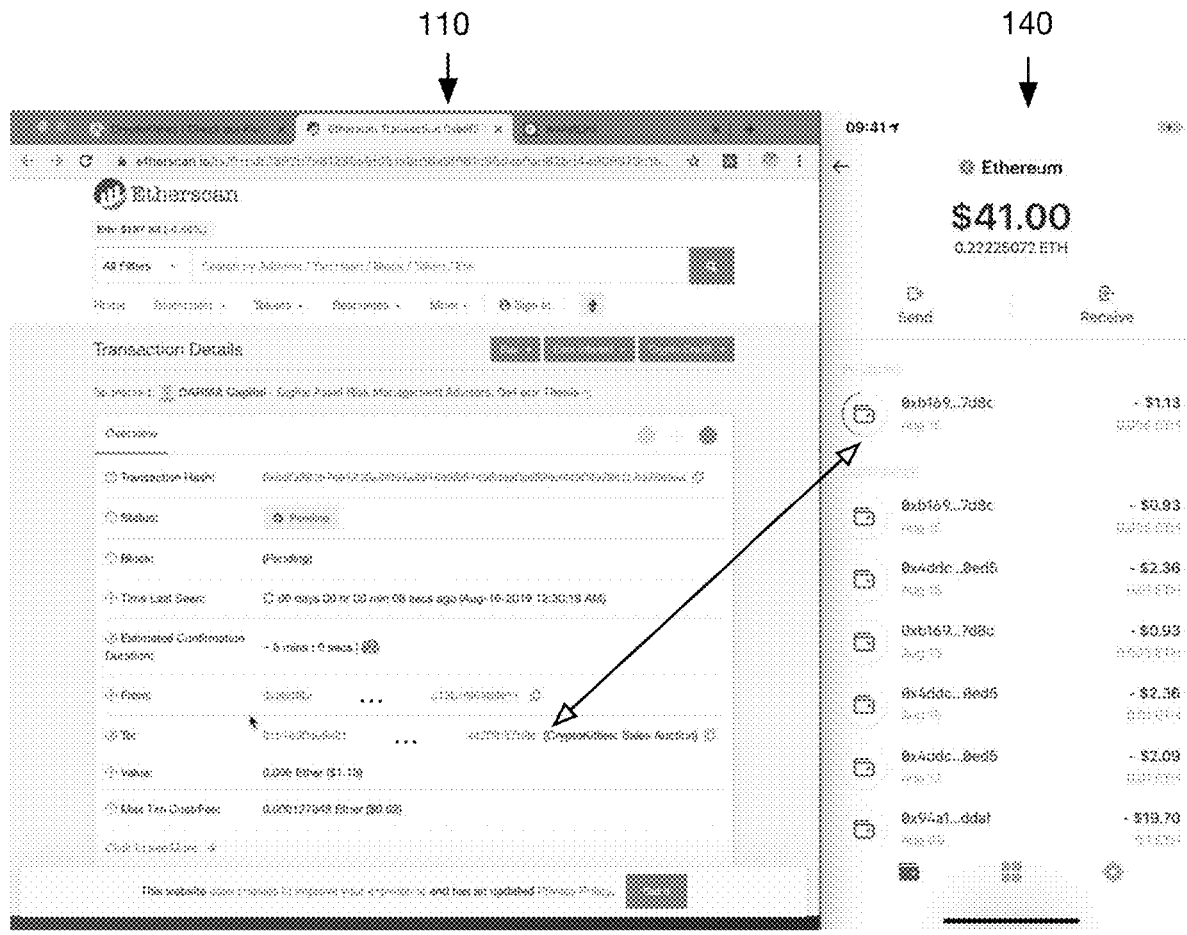

Sending the credentials to a mobile application S240 can function to provide the session credentials to the mobile application for message decryption and encryption. The credentials are preferably sent by the web client, but can additionally or alternatively be sent by any other component. The credentials are preferably sent after determining a mobile application connect event (e.g., action performed by a user that represents intent to transact with a webpage), but can additionally or alternatively be sent after S220, after S230, or at any other time. The mobile application connect event can be a mouse event, an audio event, and/or receipt of a connect request from the webpage (e.g., sent by the webpage to the web client in response to user selection of a "connect" button the webpage), and/or any other suitable event. A specific example is depicted in FIG. 6.

Sending the credentials can include generating one or more packets, each with all or some of the credentials, and transmitting the packet to the mobile application. The packet can include: an optical pattern encoding the session credentials (e.g., barcode, QR code, etc.), short-range protocol packet (e.g., Bluetooth packet, NFC packet, etc.), acoustic signature encoding the session credentials, and/or other data packet.

In a first variant, sending the credentials can include generating and displaying an optical pattern encoding of the credentials, wherein the mobile application scans the optical pattern and extracts the credentials therefrom. The optical pattern encoding can be generated by the web client and displayed on the web client domain (e.g., in a popup over the website) and/or generated and displayed by any other component.

In a second variant, sending the credentials can include using the short-range communication system of the user device to send the credentials directly to the mobile application. However, the credentials can be otherwise sent to the mobile application.

Storing the credentials in the application storage S250 can function to enable later use of the credentials (e.g., for encrypting and decrypting messages). The credentials are preferably stored by the mobile application in the application storage. The application storage is preferably user device storage (e.g., local storage, storage dedicated to the application, storage microchips, internal SSD, SD card, etc.), but can additionally or alternatively be remote storage (e.g., on a third-party storage system, on the backend, etc.) or any other suitable storage. However, the credentials can be otherwise stored.

Binding the mobile application to the session using the credentials S260 can function to bind the mobile application to the session using the session identifier. Binding the mobile application to the session is preferably performed by the backend, but can additionally or alternatively be performed by any other component. The mobile application can be bound to the session using the session identifier (and optionally, other access information, such as the access token) received from the mobile application, which is preferably the same as the session identifier received from the client that was used to create the session. Additionally or alternatively, the session identifier can be different, in which case the communication channel is not established.

In a first variant, the mobile application can send the session identifier directly to the backend (e.g., as plaintext, encoded, etc.). The backend can bind the mobile application to the session sharing the session identifier (e.g., using the session identifier received from the mobile application matching a session identifier received from the web client associated with the registered session). Binding the mobile application to an existing session functions to establish a communication channel between the webpage and the mobile application that can be used to facilitate execution of one or more transactions (e.g., between the webpage that was used to create the communication channel, a different webpage displayed on the same browser, etc.). An example is depicted in FIG. 5.

When the second session identifier is different from the first session identifier, the communication channel is not created (e.g., the method can be re-performed to establish a connection between the mobile application and the webpage). Additionally or alternatively, a new session can be created, the mobile application can be connected to a different session (e.g., sharing the mobile application-provided session identifier), and/or otherwise managed.

In a second variant, the mobile application and the web client can establish a direct connection via a short-range communication channel (e.g., via Bluetooth, NFC, etc.) shared by the respective computing systems, wherein any subsequent messages are transmitted over the short-range communication channel (e.g., as depicted in FIG. 5). However, the mobile application can be otherwise bound to the session.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

What is claimed:

1. A method for facilitating a browser-based session across different applications via multiple shared secret instances in multiple application storages, the method comprising:
   obtaining, by a client, a message via a webpage presented on a browser, the webpage being associated with a decentralized application;
   encrypting, by the client, the message using a first copy of a shared secret, the first copy being stored in a browser storage associated with the browser;
   sending, by the client, the encrypted message to a user application different from the browser, the user application being associated with an application storage different from the browser storage;
   generating, by the user application, a signed message from the encrypted message by decrypting the encrypted message to obtain the message and signing the message;
   generating, by the user application, an encrypted signed message by encrypting the signed message using a second copy of the shared secret stored in the application storage;
   sending, by the user application, the encrypted signed message to the client via the browser; and
   generating, by the client, a response comprising the signed message for the decentralized application by decrypting the encrypted signed message using the first copy of the shared secret stored in the browser storage.

2. The method of claim 1, wherein the webpage comprises the client as an embedded client that executes on the browser.

3. A non-transitory computer-readable media storing instructions that, when executed by one or more processors, cause operations comprising:
   obtaining a message via a webpage associated with a decentralized application;
   encrypting the message using a first instance of credentials, the first instance being stored in a browser storage associated with a browser;
   sending the encrypted message to a user application different from the browser, the user application being associated with an application storage different from the browser storage;
   obtaining an encrypted signed message from the user application, the encrypted signed message being generated by the user application encrypting a signed message using a second instance of the credentials stored in the application storage, the signed message being a digitally-signed version of the message; and
   generating a response comprising the signed message for the decentralized application by decrypting the encrypted signed message using the first instance of the credentials stored in the browser storage.

4. The non-transitory computer-readable media of claim 3, wherein the webpage comprises an embedded client that executes on the browser, and wherein the client, via the browser while executing on the browser, performs the obtaining of the message, the encrypting of the message, the decryption of the encrypted signed message after obtaining the encrypted signed message from the user application, and the generation of the response for the decentralized application.

5. The non-transitory computer-readable media of claim 3, wherein the user application comprises a mobile wallet application.

6. The non-transitory computer-readable media of claim 3, wherein the browser is a desktop browser, and wherein the user application runs on a user device separate from the desktop browser.

7. The non-transitory computer-readable media of claim 3, the operations further comprising:
generating the credentials, wherein the generated credentials is stored as the first instance of the credentials in the browser storage, and wherein the generated credentials is stored by the user application as the second instance of the credentials in the application storage.

8. The non-transitory computer-readable media of claim 7, wherein the decentralized application is a second decentralized application, and the webpage is a second webpage associated with the second decentralized application, and
wherein generating the credentials comprises generating, by the browser, the credentials in response to access of a first webpage associated with a first decentralized application.

9. The non-transitory computer-readable media of claim 8, wherein the first webpage comprises a web client embedded on the first webpage, and
wherein generating the credentials comprises generating the credentials by the embedded web client executing at the browser.

10. The non-transitory computer-readable media of claim 8, the operations further comprising:
generating, by the browser, a graphical encoding representing the credentials for presentation on the browser,
wherein the user application obtains the credentials by scanning of the graphical encoding presented on the browser.

11. The non-transitory computer-readable media of claim 3, wherein the credentials correspond to a session related to the browser.

12. The non-transitory computer-readable media of claim 3, wherein the first instance comprises a first key instance of a session key, and the second instance comprises a second key instance of the session key.

13. A method comprising:
obtaining, by a browser, a message via a webpage associated with a decentralized application;
generating, by the browser, an encrypted message by encrypting the message using a first instance of credentials stored in a browser storage associated with the browser;
obtaining, by a user application different from the browser, the encrypted message from the browser;
generating, by the user application, a signed message from the encrypted message by decrypting the encrypted message using a second instance of the credentials stored in an application storage (i) associated with the user application and (ii) different from the browser storage; and
generating, by the user application, a response for the decentralized application, the response comprising the signed message.

14. The method of claim 13, wherein the user application comprises a mobile wallet application.

15. The method of claim 13, wherein the browser is a desktop browser, and wherein the user application runs on a user device separate from the desktop browser.

16. The method of claim 13, wherein the decentralized application is a second decentralized application, and the webpage is a second webpage associated with the second decentralized application, and wherein the credentials are generated by the browser in response to access of a first webpage associated with a first decentralized application.

17. The method of claim 16, wherein the first webpage comprises a web client embedded on the first webpage, and wherein the credentials are generated by the embedded web client executing at the browser.

18. The method of claim 13, further comprising:
obtaining, by the user application, the credentials by scanning a graphical encoding presented on the browser, the graphical encoding representing the credentials; and
storing, by the user application, the obtained credentials as the second instance of the credentials in the application storage.

19. The method of claim 13, wherein the credentials correspond to a session related to the browser.

20. The method of claim 13, wherein the first instance comprises a first key instance of a session key, and the second instance comprises a second key instance of the session key.

* * * * *